US009001682B2

(12) United States Patent
Kovvali et al.

(10) Patent No.: US 9,001,682 B2
(45) Date of Patent: Apr. 7, 2015

(54) CONTENT AND RAN AWARE NETWORK SELECTION IN MULTIPLE WIRELESS ACCESS AND SMALL-CELL OVERLAY WIRELESS ACCESS NETWORKS

(71) Applicant: Movik Networks, Westford, MA (US)

(72) Inventors: Surya Kumar Kovvali, Westborough, MA (US); Charles Boyle, Upton, MA (US); Rajat Ghai, Sandwich, MA (US); John St. Amand, Moultonborough, NH (US); Greg Alden, Alexandria, VA (US)

(73) Assignee: Movik Networks, Westford, MA (US)

( * ) Notice: Subject to any disclaimer, the term of this patent is extended or adjusted under 35 U.S.C. 154(b) by 204 days.

(21) Appl. No.: 13/679,458

(22) Filed: Nov. 16, 2012

(65) Prior Publication Data

US 2013/0143542 A1 Jun. 6, 2013

Related U.S. Application Data

(63) Continuation-in-part of application No. 13/555,787, filed on Jul. 23, 2012.

(60) Provisional application No. 61/561,556, filed on Nov. 18, 2011, provisional application No. 61/621,031, filed on Apr. 6, 2012, provisional application No. 61/561,538, filed on Nov. 18, 2011, provisional application No. 61/510,217, filed on Jul. 21, 2011.

(51) Int. Cl.
*H04W 48/18* (2009.01)
*H04W 36/14* (2009.01)
(Continued)

(52) U.S. Cl.
CPC .............. *H04W 48/18* (2013.01); *H04W 36/14* (2013.01); *H04W 24/02* (2013.01); *H04W 28/0236* (2013.01); *H04W 24/08* (2013.01); *H04W 88/18* (2013.01); *H04W 48/04* (2013.01)

(58) Field of Classification Search
None
See application file for complete search history.

(56) References Cited

U.S. PATENT DOCUMENTS 6,661,778 B1 12/2003 Trofin et al.
7,197,067 B2 * 3/2007 Lusky et al. .................. 375/224
(Continued)

OTHER PUBLICATIONS

International Search Report/Written Opinion mailed Oct. 16, 2012 in co-pending PCT application No. PCT/US 12/47851.
(Continued)

*Primary Examiner* — Kerri Rose
(74) *Attorney, Agent, or Firm* — Nields, Lemack & Frame, LLC

(57) ABSTRACT

Methods for steering the access technology selection by a mobile device in an overlay Small-Cell and Macro Network, such as UMTS, LTE, CDMA, or WIFI are disclosed. This selection determination is based on the observed, real-time correlated and estimated network congestion, content-awareness, application/service expectations, and other criteria. Methods and procedures to influence network selection or control currently selected networks by propagating real-time correlated and consolidated information on a plurality of Radio Access Technologies to Access Points, or modifying the list of alternative Radio Access Technologies available at a location using standards defined mechanisms and parameters are identified. Additionally, steering content access and delivery through alternative access technologies, based on anticipated network usage by user's service activation, and the knowledge of the type, state and resource usage of a plurality of access networks when a mobile device connects to multiple access technologies through in-band or out-of-band mechanisms is identified.

17 Claims, 13 Drawing Sheets

(51) Int. Cl.
*H04W 88/18* (2009.01)
*H04W 24/02* (2009.01)
*H04W 28/02* (2009.01)
*H04W 24/08* (2009.01)
*H04W 48/04* (2009.01)

(56) References Cited

U.S. PATENT DOCUMENTS

| | | | |
|---|---|---|---|
| 7,590,427 B2 * | 9/2009 | Villwock et al. | 455/509 |
| 7,609,650 B2 | 10/2009 | Roskowski | |
| 7,843,829 B1 * | 11/2010 | Truong et al. | 370/235 |
| 7,864,727 B2 * | 1/2011 | Inayoshi et al. | 370/329 |
| 8,023,419 B2 | 9/2011 | Oran | |
| 8,111,630 B2 | 2/2012 | Kovvali et al. | |
| 8,208,430 B2 | 6/2012 | Valmikam et al. | |
| 8,565,076 B2 | 10/2013 | Kovvali et al. | |
| 8,576,744 B2 | 11/2013 | Kovvali et al. | |
| 8,908,507 B2 | 12/2014 | Kovvali et al. | |
| 2003/0095526 A1 | 5/2003 | Froehlich et al. | |
| 2004/0233851 A1 | 11/2004 | Baldwin et al. | |
| 2005/0213511 A1 | 9/2005 | Reece, Jr. et al. | |
| 2006/0193289 A1 | 8/2006 | Ronneke et al. | |
| 2006/0194599 A1 * | 8/2006 | Villwock et al. | 455/509 |
| 2007/0153689 A1 | 7/2007 | Strub et al. | |
| 2007/0293235 A1 * | 12/2007 | Inayoshi et al. | 455/455 |
| 2008/0141072 A1 | 6/2008 | Kalgren et al. | |
| 2008/0244095 A1 | 10/2008 | Vos et al. | |
| 2008/0311855 A1 * | 12/2008 | Manousakis et al. | 455/67.11 |
| 2009/0270098 A1 | 10/2009 | Gallagher et al. | |
| 2009/0274161 A1 | 11/2009 | Liu | |
| 2010/0034089 A1 | 2/2010 | Kovvali et al. | |
| 2010/0034218 A1 | 2/2010 | Kovvali et al. | |
| 2010/0195602 A1 | 8/2010 | Kovvali et al. | |
| 2010/0248638 A1 * | 9/2010 | Harada et al. | 455/67.11 |
| 2010/0291943 A1 | 11/2010 | Mihaly et al. | |
| 2012/0076120 A1 | 3/2012 | Kovvali et al. | |
| 2012/0077500 A1 | 3/2012 | Shaheen | |
| 2012/0082146 A1 * | 4/2012 | Andreasen et al. | 370/338 |
| 2012/0099533 A1 | 4/2012 | Kovvali et al. | |
| 2012/0120788 A1 | 5/2012 | Hu | |
| 2012/0184258 A1 | 7/2012 | Kovvali et al. | |
| 2012/0220328 A1 | 8/2012 | Yu et al. | |
| 2013/0021928 A1 | 1/2013 | Weill et al. | |
| 2013/0021933 A1 | 1/2013 | Kovvali et al. | |
| 2013/0072222 A1 | 3/2013 | Weill et al. | |
| 2013/0235845 A1 | 9/2013 | Kovvali et al. | |
| 2013/0258865 A1 | 10/2013 | Kovvali et al. | |
| 2014/0016509 A1 | 1/2014 | Kovvali et al. | |
| 2014/0056137 A1 | 2/2014 | Kovvali et al. | |

OTHER PUBLICATIONS

ETSI TS 124 312 V11.5.0, Technical Specification, Jan. 2013, Universal Mobile Telecommunications Systems (UMTS); LTE; Access Network Discovery and Selection Function (ANDSF) Management Object (MO), (3GPP TS 24.312 version 11.5.0 Release 11), 175 pages.

ETSI TS 123 402 V11.4.0, Technical Specification, Nov. 2012, Universal Mobile Telecommunication System (UMTS); LTE; Architecture enhancements for non-3GPP accesses (3GPP TS 23.402 version 11.4.0 Release 11), 254 pages.

Office Action mailed Nov. 13, 2014 in co-pending U.S. Appl. No. 13/858,473.

Office Action mailed Aug. 26, 2014 in co-pending U.S. Appl. No. 14/071,009.

Office Action—Restriction—mailed Dec. 26, 2013 in co-pending U.S. Appl. No. 13/183,777.

Office Action mailed May 23, 2014 in co-pending U.S. Appl. No. 13/183,777.

* cited by examiner

| WIFI | Network/User State | Macro Network |
|---|---|---|
| Stationary:<br>- Coffee Shops<br>- Shopping Malls<br>- Airports<br>- Laptops<br>- Stadiums | Network Un-Congested:<br><br>NO ACTION | Wireless Mobile users<br>- Car or Train<br>- Airports<br>- Parking lots<br>- Venue Stadiums<br>- Periodic, Light Traffic<br>- Background email<br>- Voice Chat |
| Identify Mobile Users<br>Move Mobile Users to Macro →<br>Stationary Users moved to WIFI ← | Network Congested:<br><br>← Mobility Based Selection → | Identify Stationary Users<br>→ Mobile users moved to Macro<br>← Move Stationary Users to WIFI |
| Move Periodic, Light,<br>Background, Voice chat<br>users to Macro → | Network Congested:<br><br>← Usage Pattern Based Selection → | ← Move sustained heavy users,<br>video, Video Chat, Application<br>updates to Macro |

FIG. 10

| Timeline | User Pattern | Network Selection Function |
|---|---|---|
| Before Game | Users Walking into Stadium | Entering users high mobility; Users stay on LTE at edge sectors. If edge sector congestion increase move Stationary users in Edge Sectors to WIFI |
| Game Start | Users inside stadium | Low mobility: Move users from LTE to WIFI |
| During Game | WIFI nearing congestion | Move select users to LTE |
| Game Ends | Users leave Stadium | in-stadium users move to LTE exit sectors; move stationary users to WIFI |

FIG. 11

CONTENT AND RAN AWARE NETWORK SELECTION IN MULTIPLE WIRELESS ACCESS AND SMALL-CELL OVERLAY WIRELESS ACCESS NETWORKS

This application is a continuation-in-part of U.S. patent application Ser. No. 13/555,787, which claims priority of U.S. Provisional Application Ser. No. 61/510,217, filed Jul. 21, 2011; U.S. Provisional Patent Application Ser. No. 61/561,538, filed Nov. 18, 2011 and U.S. Provisional Patent Application Ser. No. 61/621,031, filed Apr. 6, 2012. This application also claims priority of U.S. Provisional Patent Application Ser. No. 61/561,556, filed Nov. 18, 2011. The disclosures of each of these applications are incorporated herein by reference in their entireties.

BACKGROUND

A growing number of portable user communication devices, such as laptops, tablets, smart phones, and feature phones, support multiple wireless technologies, such as WIFI, WIMAX and Cellular Wireless Technologies (GSM/SPRS, Edge, HSPA, LTE, CDMA). Within the cellular wireless technology, also known as the Radio Access Network (RAN), provided by a wireless cell operator, there could be multiple technologies, such as GSM/GPRS, Edge, HSPA, LTE, 1XRTT, EVDO and others. Standard protocols (such as 3GPP, 3GPP2) define control protocols by which the user device selects a component access technology with the same class of RAN (for example GSM/GPRS, Edge, HSPA, or LTE) based on the signal strength seen by the user device and Public Land Mobile Network (PLMN) type. The service is initiated by the user in co-ordination with the Base Station and Radio Network Controller. However wireless LAN technologies, such as WIFI and WiMAX, originally developed for enterprise and private networks, are becoming increasingly available as WIFI hotspots in several areas, such as airports, event stadiums, shopping malls and other venues. These services may be offered by the same operator as the wireless cell operator or by a different operator. Also, cell operators are deploying micro and femto cells in certain locations to increase the capacity and coverage in dense locations.

As mentioned above, the network selection in the majority of the mobile wireless devices is based on Received Signal Strength or based on the configuration of the best network in the device, and by type of service (voice or data), that the user initiates. For example, on a UMTS device, that has connectivity to both UMTS and WIFI networks, when the user initiates a circuit switched (CS) service, such as a voice call or SMS, the device uses the UMTS RAN. When the user initiates packet switched (PS) services, the device uses WLAN. If the device is currently not associated with a WIFI access point (AP), and if the WIFI radio is enabled, the device attempts to connect to the highest priority WLAN/SSID that it successfully connected to previously. The load on the WLAN or the UMTS RAN, whether the user device is in high mobility environment, and the type of content or resource needs of the user application are not factored into the access network selection. Thus, with the above methods, when a number of users enter the vicinity of a WIFI AP, and the users are authorized to use the WLAN, all the user devices connect to and start using the WLAN for packet services thus causing congestion on that particular WLAN. Additionally, if the user is mobile and moving in and out of WIFI-AP coverage area, his service keeps oscillating between WLAN and RAN for packet services.

3GPP standards define Access Network Discovery and Selection (ANDSF) methods by which a mobile device identifies which access network to connect to (Network Selection and Inter System Mobility Policy), or which network to route specific IP flows to (Inter System Routing Policy). This framework uses a client application (ANDSF Client) and server (ANDSF Server) in the operator's core network. The ANDSF Server may be a new device in the operator network or its function may be incorporated into an existing core network (CN) device, such as the PCRF. The ANDSF server communicates priorities for one or more access networks or for forwarding selective IP flows to the ANDSF Client in user device. The client's connection to the ANDSF Server may be client initiated (client pull) or initiated using Network Push through mechanisms, such as SMS. The network policy propagated by the ANDSF server could indicate that in a specific location (such as particular RAN sector ID or geo location), a specific WLAN has a higher priority. Thus, a client application could turn on the WIFI radio when it enters the coverage area of a sector. The standards do not specify how the ANDSF server prioritizes the access networks for a user, or a dynamic mechanism that the ANDSF server should use based on congestion, network state or user access patterns of the access networks.

Thus, an improved system and method for selecting an appropriate network for a user device, based on criteria, such as mobility, congestion, and usage pattern, would be beneficial.

SUMMARY

Methods for steering the access technology selection by a mobile device in an overlay Small-Cell and Macro Network, such as UMTS, LTE, CDMA, or WIFI are disclosed. This selection determination is based on the observed, real-time correlated and estimated network congestion, content-awareness, application/service expectations, and other criteria. Methods and procedures to influence network selection or control currently selected networks by propagating real-time correlated and consolidated information on a plurality of Radio Access Technologies to Access Points, or modifying the list of alternative Radio Access Technologies available at a location using standards defined mechanisms and parameters are identified. Additionally, steering content access and delivery through alternative access technologies, based on anticipated network usage by the user's applications and the knowledge of the type, state and resource usage of a plurality of access networks when a mobile device connects to multiple access technologies through in-band or out-of-band mechanisms is identified.

BRIEF DESCRIPTION OF THE FIGURES

FIG. 10 shows summary criterion for network selection based on the key metrics that RTND uses for deciding target networks, and specific users.

FIG. 11 shows an example use case for network selection during a game event in a stadium.

DETAILED DESCRIPTION

Figure 1:
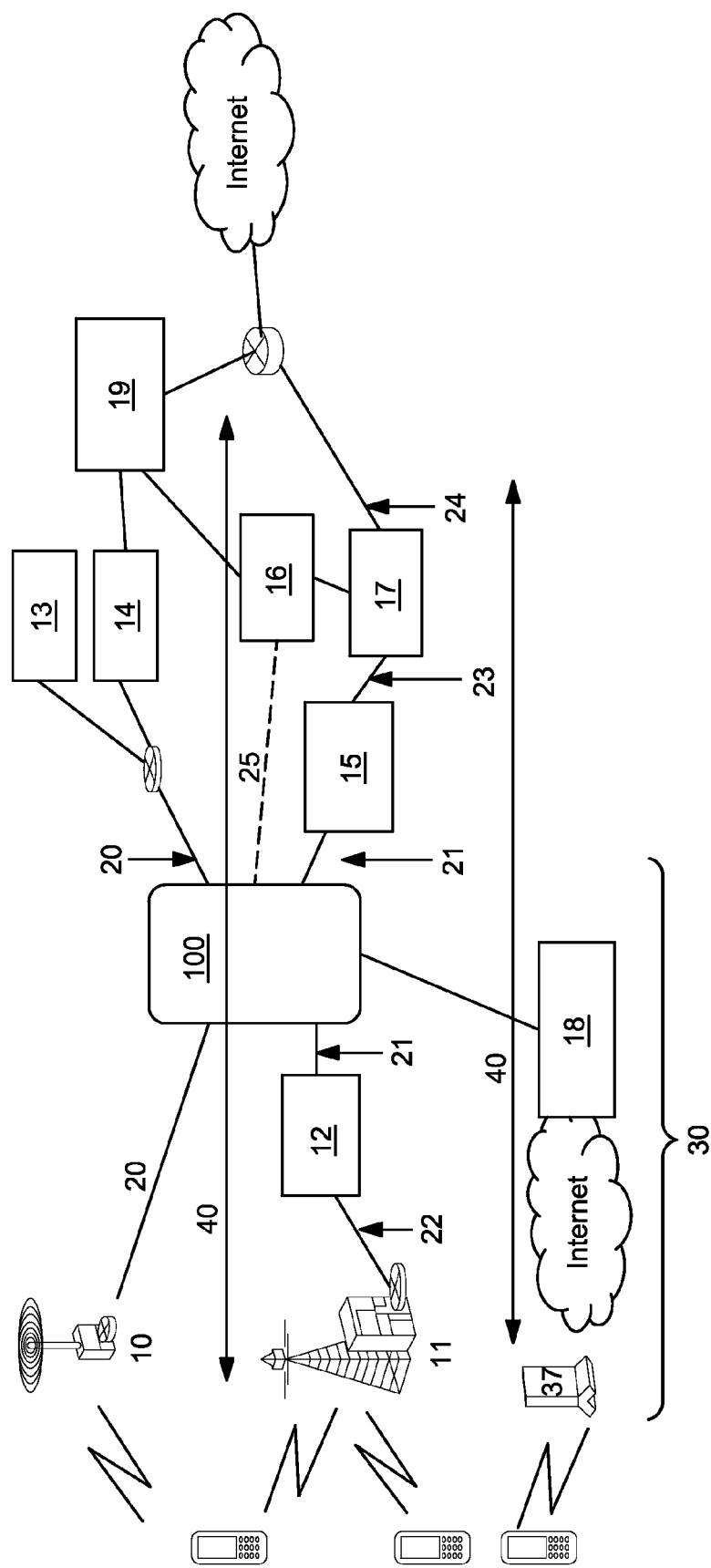
FIG. 1 illustrates an RIND deployment in a small-cell overlay network with UMTS/LTE access Network. This is an example configuration of the RAN Transmit Network Device in intercepting mode in UMTS and LTE Networks.

The consolidation of Network and User Key Performance Indices (KPIs) and exporting this information to external devices is described in co-pending U.S. patent application Ser. No. 13/555,787. The KPIs and additional information, such as whether user is inside a densely populated venue, such as a stadium venue or is a stationary user in a RAN Macro Sector in the coverage area near the boundary of a stadium that could have large number of mobile users leaving the stadium at event completion, can be used to influence the selection of alternate networks. For example, according to one embodiment, a stationary user located in an area consuming high bandwidth can be moved to a WLAN outside the stadium, or a user that is determined as an "inside stadium user", can be moved to a microcell inside the stadium when the corresponding Macro Network is heavily utilized.

U.S. Pat. No. 8,111,630, the disclosure of which is incorporated herein by reference in its entirety, outlines methods by which a RAN transit network device (RTND) deployed in a Radio Access Network monitors control and user plane protocols, identifies user sessions, associated sectors, the type of content being accessed and estimates sector congestion in a transparent manner. Such a device may be deployed as an in-line proxy and caching device, or as a monitoring only device as identified in the co-pending application, U.S. application Ser. No. 13/555,787, using an optical TAP or Port Mirror in the RAN transit network device to deliver a copy of the control plane and user plane protocol packets to the RAN Transit Network Device. The RAN transit network device may be deployed to intercept or monitor multiple logical interfaces corresponding to different Radio Access Technologies, such as IUPS interface in UMTS Network, S1 in LTE, A8/A9 or A10/A11 interface in CDMA, and others, to identify the type of content being accessed by a plurality of users, and to identify the sectors corresponding to those users in each Radio Access Technology.

The present invention identifies methods and procedures to use the monitored and estimated information to influence RAN access network selection made by new user devices attempting to access a network, or steer already connected user devices to alternative access networks (such as micro/pico/femto cells in the same Radio Access Technology). Additionally, the present methods may steer a user to other Radio Access Technologies using in-band methods by modifying packet flows between two other network elements. In other embodiments, out-of-band methods are used. In this case, the RAN transit network device (RTND) exports network selection decisions and/or summarized metrics to influence the access network selection or route-selection function for some flows to other network elements such as the ANDSF Server, PCRF, Wireless LAN Controller (WC), or SON Server, or Small-cell controller using a logical interface.

The terms, "inline" and "monitoring" refers to the logical interfaces that RTND is receiving protocol packets for deriving KPI metrics. For exporting derived metrics and/or network/flow selection decisions or modifying access-network priorities such as ANDSF messages, the RTND could originate, intercept or modify ANDSF protocol messages even if it is operating in monitoring mode only for RAN protocols such as IUPS, S1, A8/A9/A10/A11 and could not modify these protocol messages.

Such steering and selection mechanisms could be through in-band mechanisms when the RAN transit network device incorporating these methods is deployed as an in-line device intercepting logical interfaces, as shown in FIG. 1. FIG. 1 illustrates RIND deployment in a small-cell overlay network with UMTS/LTE access Network. The network elements shown, such as eNodeB 10, NodeB 11, RNC 12, MME 13, SGW 14, SGSN 15, PCRF 16, GGSN 17, HNB-GW 18, and PDN-GW 19, are per the 3GPP Standards. The interfaces, such as S1C/S1U 20, IuPs/IuCs 21, IuB 22, Gn 23, Gi 24 and Gx 25, are protocol interfaces in the corresponding standards. This diagram shows a small-cell overlay network 30 covering portion of the UMTS/LTE Macro Network 40. In accordance with this embodiment, the RAN Transit Network Device (RIND) 100 is deployed in-line to intercept multiple Radio Access Technology interfaces. In this configuration, the RTND 100 could modify/insert/delete messages that it is intercepting.

Figure 2:
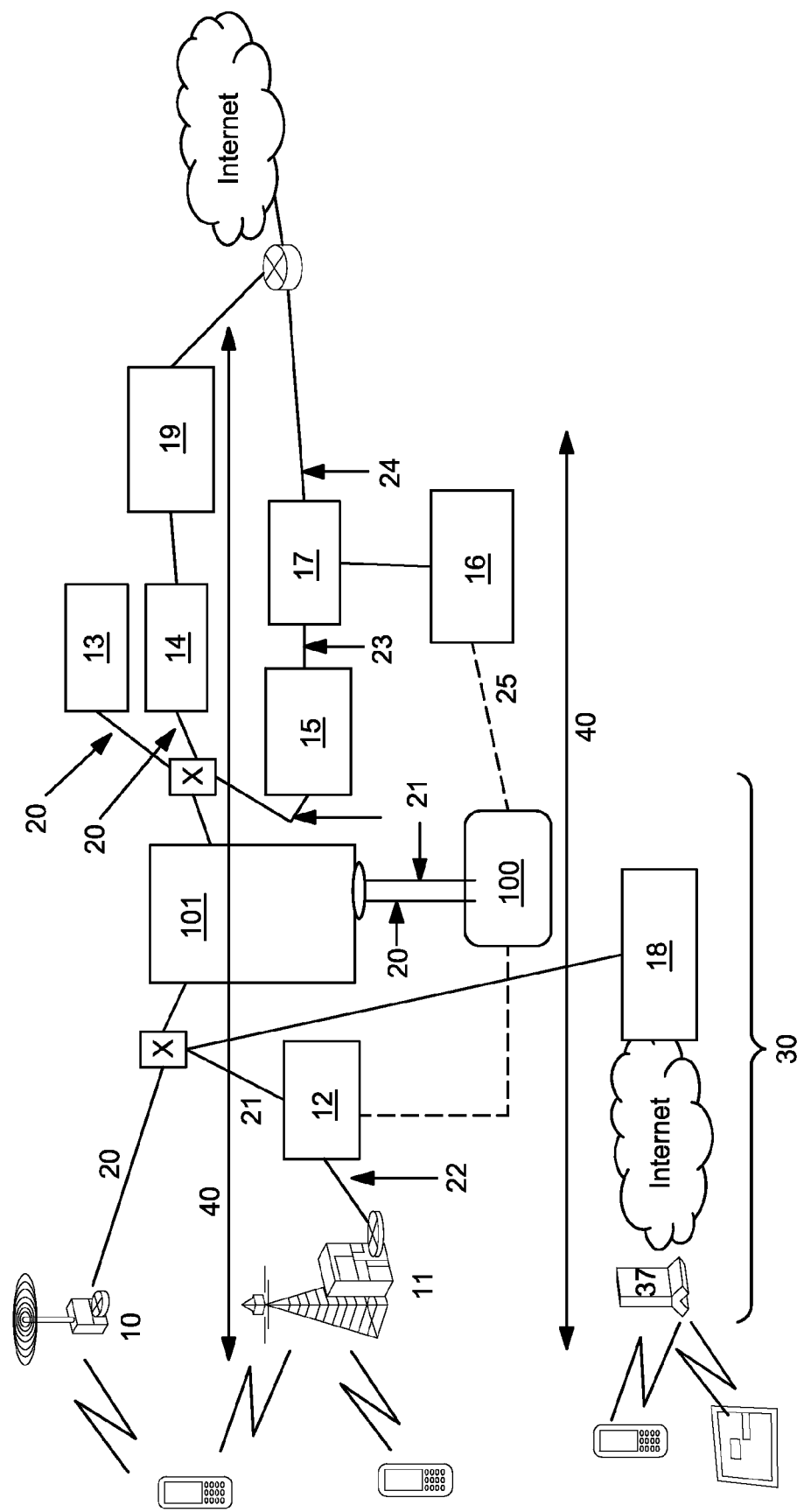
FIG. 2 shows an RIND deployment in monitoring mode where it monitors the same logical interfaces as in FIG. 1, using optical TAP interface. This is an RIND deployment in monitoring mode using Optical-TAP in UMTS and LTE Networks.
Figure 3:
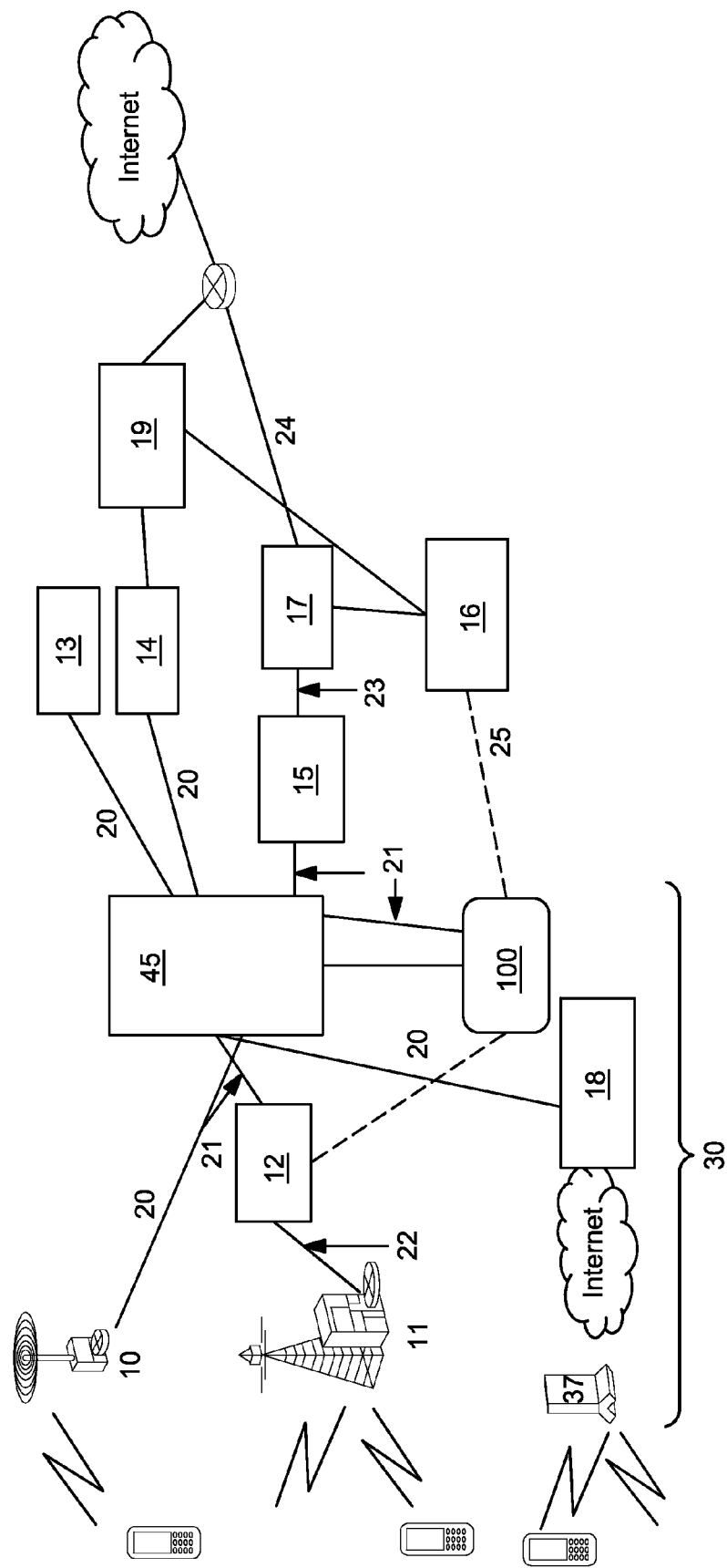
FIG. 3 shows an RIND deployment in monitoring mode while connected to a transit L2/L3 switch. This is an RIND deployment in monitoring mode using port mirroring from the L2/L3 switch in UMTS and LTE networks.

In a second embodiment, the RIND 100 may be deployed in monitoring mode, where it uses out-of-band mechanisms. FIG. 2 shows a RIND deployment in monitoring mode where it monitors the same logical interfaces as in FIG. 1, but cannot modify/insert/delete messages that it is monitoring. The diagram shows the RIND 100 is connected to the RAN using an optical TAP interface 101. In this configuration, the RIND 100 performs the functions identified herein and exports the actions to external devices, such as PCRF 16. FIG. 3 is similar to FIG. 2 in that the RIND 100 is deployed in monitoring mode. However, in this embodiment, the RIND 100 is connected to a transit L2/L3 switch 45 instead of an optical port. The transit L2/L3 switch 45 is configured to forward messages from the logical interfaces shown.

In both modes of operation, the RAN transit network device determines the appropriate network/flow selection, and either performs actions locally if it can directly influence network/flow selection by modifying protocol messages that it is receiving (see FIG. 1) or exports the local decisions via in-band methods (see FIGS. 2 and 3), such as by using header enrichment in HTTP) or generating triggers to other core network (CN) and access network devices to influence access network selection using unique protocols to those devices.

Figure 5:
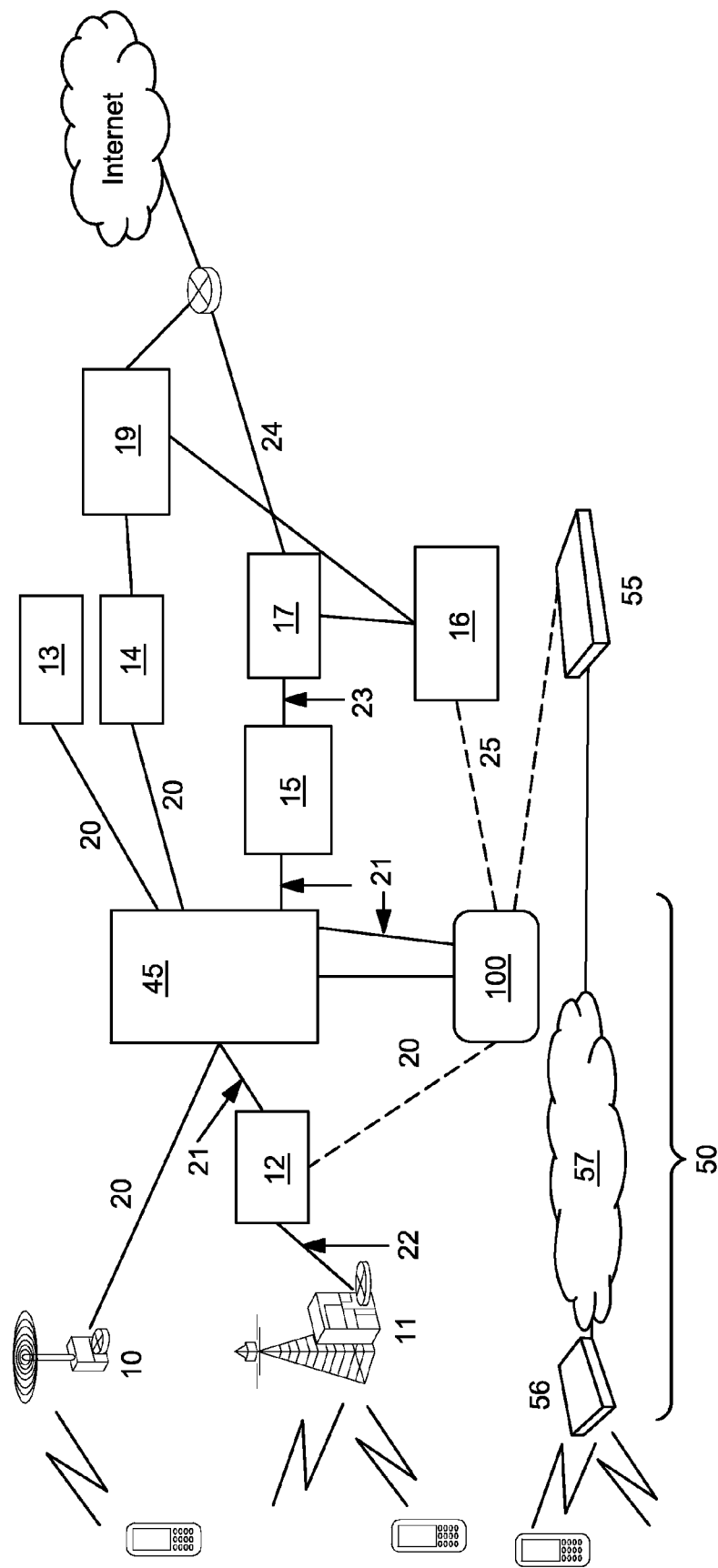
FIG. 5 shows an RIND deployment example in a WIFI overlay network with UMTS and LTE networks, where the WIFI overlay network is covering a small portion of UMTS/LTE RAN sector.
Figure 6:
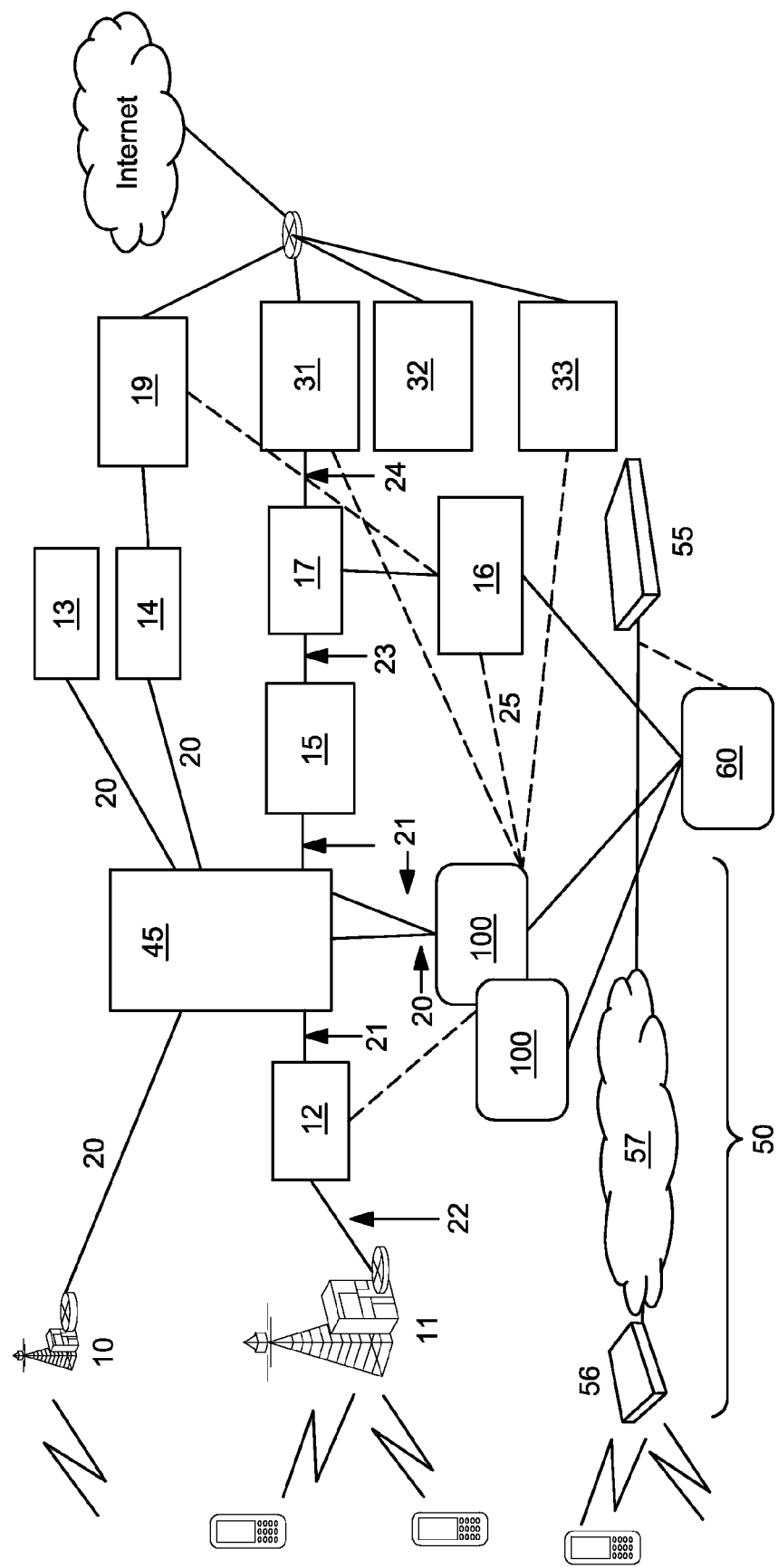
FIG. 6 shows an RIND deployment where the multiple RTNDs connect to a network-wide element management system (EMS), and RIND exports network/flow selection functions to other operator network devices through EMS. The RTNDs export KPIs to a WLAN controller, and the PCRF via Element Management System (EMS).
Figure 7:
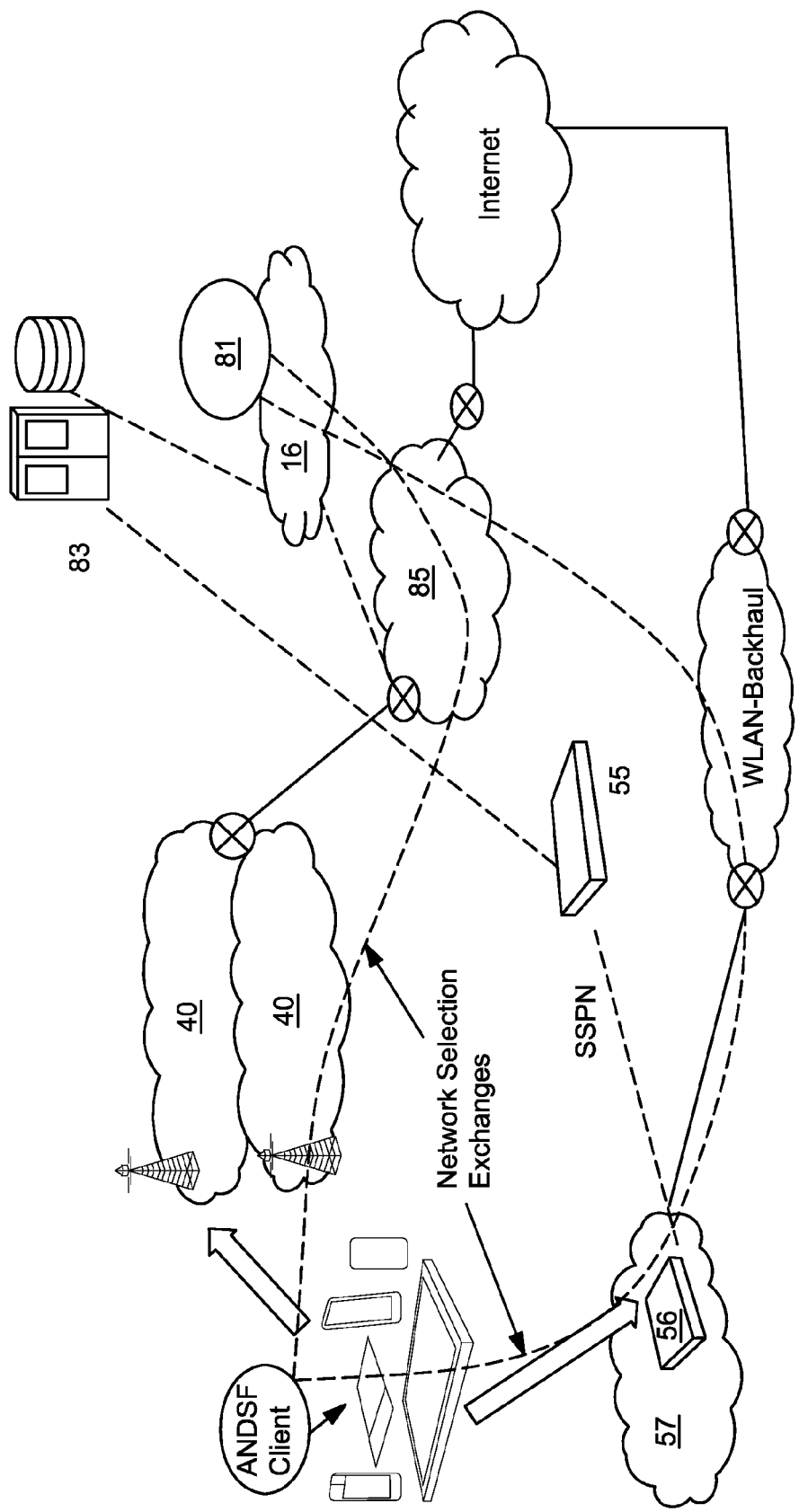
FIG. 7 shows prior-art network selection methods using ANDSF Client and ANDSF server per the 3GPP standards.

FIG. 5 shows a RIND deployment in a WIFI overlay network 50 with UMTS and LTE networks. A WIFI access point 56 is used to connect the user to the private network 57. In this configuration, the RIND 100 exchanges messages with WLAN controller 55 for WIFI information. FIG. 6 shows the RIND 100 exporting Network Selection/Control information to an O&M/Element Management System 60 that interfaces with multiple RTNDs 100 and exports information to other devices such as PCRF 16, ANDSF and others, to initiate network selection policies. FIG. 6 also shows a load balancer 31, video optimizer 32, and CDN (content delivery network) 33. The present invention extends the Self Optimizing Network (SON) methods defined in 3GPP standards by including content awareness, Key Network Performance Indices (Network-KPIs) from a plurality of Radio Access Networks from historical and recently observed usage patterns, along with the estimated user service requirements when the user initiates new network connections or new service requests to RAN devices, such as eNodeB, Small-cell Access point, RNC/NodeB and others, that perform RRM (Radio Resource Management) functions, thus facilitating Content-aware SON (C-SON).

According to one embodiment, the RTND learns the type of content or applications currently accessing one or more access networks in a certain area (sector, service area or geographical location), determines the level of congestion of a plurality of network resources (control plane resources, number of voice calls, number of signaling connections, uplink and downlink bandwidth in the corresponding radio access technology), estimates the network resources needed for new users attempting to connect to the network based on the subscriber application profile (SAP) or new applications initiated by current users, and propagates the information to other RAN devices (for example to a small cell access point, NodeB in UMTS, eNodeB in LTE, PSCF in CDMA Network, Edge, WIMAX etc.), or to the core network devices (SGSN/GGSN, PDN-GW, etc.), or to Policy Control and Policy Enforcement devices, or other devices performing access network discovery and selection functions.

Figure 4:
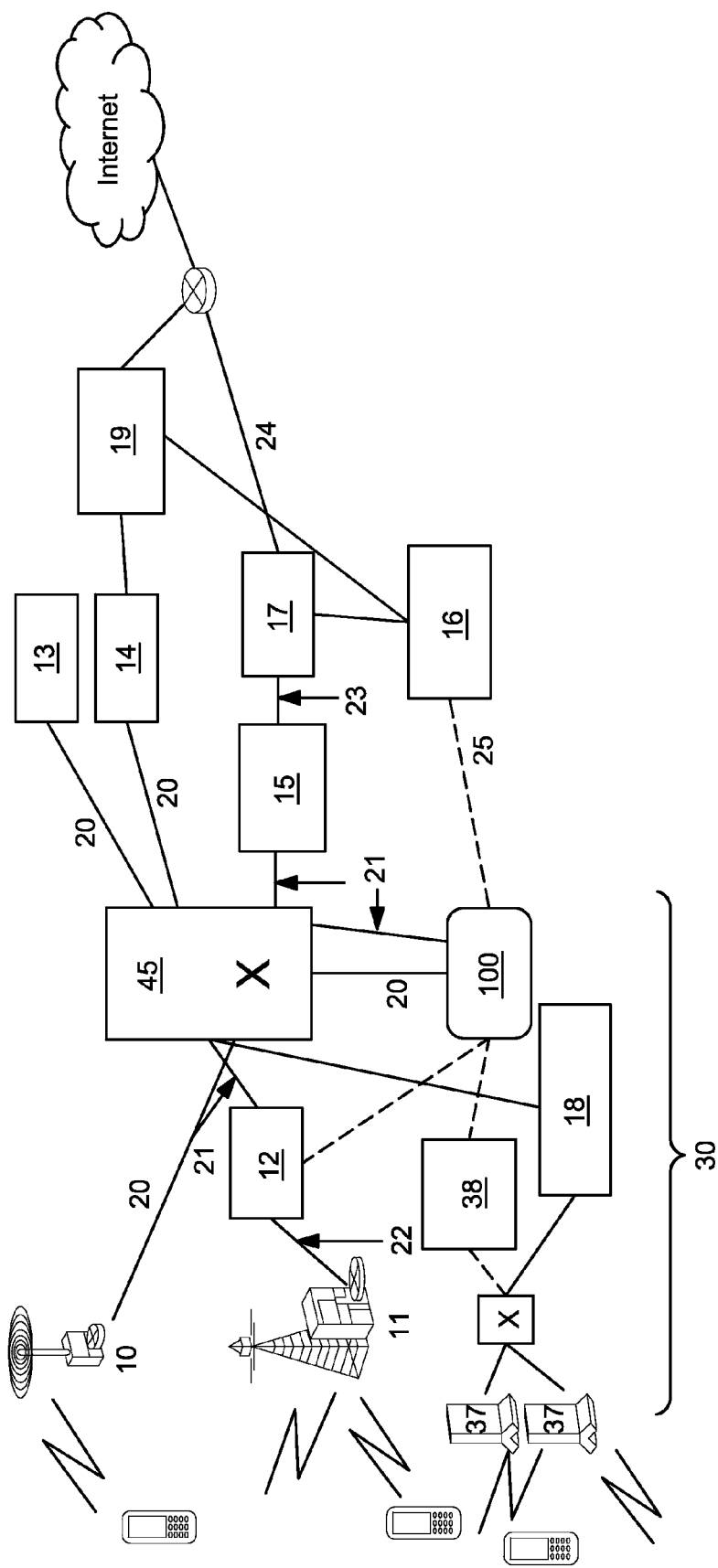
FIG. 4 shows an RIND deployment in small-cell overlay in UMTS/LTE Macro Network, where small-cell access points (Micro/Pico/Femto) access points are controlled by a Self Optimizing Network Server (SON Server) or Micro-cell controller.

A second aspect of the present invention is to learn the alternative access networks available at a geographical location or access networks seen by a subscriber by snooping (when deployed as an inline device) or by transparently monitoring a plurality of RAN protocols or access network detection protocols (ANDSF), or by interacting with access network control devices such as WIFI Controller, or SON server as shown in FIG. 4. FIG. 4 is a RIND deployment where small-cell (Micro/Pico/Femto) access points 37 are controlled by Self Optimizing Network Server (SON Server) 38 or Micro-cell controller. In this configuration, the RIND 100 interacts with the Small Cell Controller or SON Server 38 to communicate network selection decisions and to receive user coverage information. Based on this, the RIND 100 may influence network selection function in the client devices or network devices (RAN, CN or Policy Control devices, ANDSF Server etc.) or application servers in choosing the access network.

For example, in network deployments that utilize ANDSF, the present invention extends the ANDSF mechanisms that a RAN transit network device (RTND) uses to determine priorities for selecting or forwarding specific flows to different access networks based on network KPIs, UE KPIs, device type, and Application Profile/estimated usage.

In network deployments that do not use ANDSF, or in overlay networks with WLAN, and small cells, the RTND may export network selection and IP flow routing/forwarding priorities for specific subscriber devices, or class of devices in near real-time fashion to operator network devices such as Small-Cell controllers, Base stations, WLAN Controllers, PCRFs etc. These network selection and IP flow routing/forwarding priorities may be based on observed Network and User KPIs, and estimated network trend & user service need.

A third aspect of the present invention is applicable in small-cell overlay environments with a macro network when both the small cell network and overlay network use the same Radio Access Technology (RAT). An example scenario of such a use case is 3G/HSDPA Microcell deployment in a 3G/HSDPA Macro-cell network for increasing the wireless coverage and/or for increasing capacity/bandwidth in certain locations. In the prior art, a mobile device's attachment to an access point is controlled by the client device attempting to connect with the cell or access point based on the maximum signal strength that it receives, PLMN Carrier, CSG group, or other criteria, and by the Access Network authorizing the user's access. The present invention propagates additional network congestion information (Sector, Cell etc.), the type of content currently in use by other devices in the Macro/Small cell network (for example, voice calls, or Video streams etc.), or the network usage in the cell (for example, the number of signaling sessions, the number of users etc.), or historical information (such as busy hour prediction based on time of day) etc., at either an aggregate or per user level. In this way, the access point may disallow a previously authorized user device to join the micro-cell. Conversely, the RTND may propagate information that causes the access point to admit a user device that was not previously authorized for using the small-cell.

A fourth aspect of the present invention is to influence the network selection and/or forwarding of specific IP flows from a user device by core network (CN) devices such as PCRF, ANDSF Server, WIFI-Access Point Controller etc., by propagating learned congestion, user, and content information or altering the message contents in the control plane, the user plane or exchanges between the controlling entity and the user device. In some network deployments, the access network selection is done within the user device. The network policy either statically or dynamically changes priorities for network selection and/or flow forwarding rules for specific application flows when the user device connects to multiple access networks concurrently. The present invention influences such selections by the user device by modifying the policies based on user KPIs, network KPIs of a plurality of access networks, and estimating the likely usage of new user congestion information on one or more networks in that location.

The present invention further defines methods that, if the location is covered by multiple radio access technologies or is capable of increasing the network capacity or coverage area by turning on additional access points, such as microcell-APs that are normally turned off to decrease RF interference, will turn on these access points. For example, as the number of users and the types of services that they activate in a geographical location increase, a comprehensive view of the network state (network KPIs), user KPIs, and available network resources, facilitates migrating users to appropriate networks and thus distributes the load across multiple RATs. Also, if the total load by all the users in a location could not be satisfied by the available networks in that location, and no additional network resources could be configured to increase the capacity in the network, the RTND may prioritize and throttle, or export information to throttle specific users or flows using the methods described in U.S. patent application Ser. No. 13/555,787.

Next, the criteria used to select alternate access networks is described.

WIFI Access Network (WLAN) Access Points have a smaller coverage area compared to UMTS/LTE Macro cell (Macro RAN) Access Network. For registering and using a WIFI-LAN, the user first enables the radio interface on WIFI. The access point periodically broadcasts beacons advertising its SSID on a specific WIFI Channel (one of the 14 Channels that the AP could be configured to use). When the WIFI interface is enabled, the user device performs active or passive scanning per the IEEE802.11 specification to determine the networks it could connect to. The user device attempts to connect to networks it previously successfully connected with (using the priority order stored in its list). If it could not connect with any of previously connected WLANs, the user device presents the WLANs (SSIDs) that it determined in the scanning process to the user. This operation continues until it can successfully connect to an access network. However, turning on the WIFI interface, polling and exchanging messages to stay connected with the networks consumes battery power on the mobile device. Since battery power is a very important resource for a mobile device that is not connected to a power source, users typically turn off the WIFI radio on the mobile device to preserve battery charge. Thus, any policy suggested by the operator network device, such as by the ANDSF server, or by other applications in the user device, has to intelligently turn on the WIFI radio, when the probability of successfully connecting with the WIFI-AP is high. Since attempting to find an AP that the device can connect to and maintain connectivity with, even when the user is not actively using the network, consumes battery power, a WIFI network is most efficient when the user is continuously using the network or while accessing applications that require high bandwidth (such as video downloads or streaming videos), and less efficient for infrequent short message exchanges. Also unlike cellular networks, WIFI networks handle mobility very poorly. Thus, a WIFI network is most suitable when user is a stationary or nomadic, and his access need is continuous or requires high bandwidth.

Cellular Macro Networks (RAN Macro Network), such as 2G/3G/4G/LTE, and CDMA networks, have larger coverage area per sector than WIFI Access Points. Also, RAN protocols handle mobility of user device from sector to neighboring sectors using a variety of methods such as soft, softer and hard handovers in some cases without service disruption. To handle mobility, base stations allocate dedicated RF resources in a way that reduces inter cell interference. When a user device is authenticated for network access by a base station, both the user device and the network remember the authentication, and it is not necessary for the user device to re-discover the network, and re-register. Also, the fast dormancy states in the user device and Base Station allow the user device to release significant radio resources during idle periods, while maintaining minimum connectivity (such as signaling Radio Bearer) to restore resources quickly after brief periods of in-activity. Also, RAN protocols handle idle mode mobility in which the user device identifies its mobility from one sector to another. The protocols also detect if the user device crossed larger geographic areas, such as service area, location area, tracking area etc., and update the network with the user device's new location, even when there is no specific user service is active. While HSPA, LTE, CDMA protocols facilitate higher uplink and downlink BW for a user device that is getting a good RF signal (higher CQI), as the number of users in a sector and the dedicated channels to accommodate guaranteed bit rate services (GBR) increase, available resource for shared best effort services decrease. Also, RAN protocols use multiple coding schemes, and Hybrid ARQ (HARQ) methods to improve the effective channel bandwidth when the user device is at the cell edge (lower Signal to Noise Ratio). Thus, a Macro RAN network could meet the service needs of users with high mobility, low bit rate delay sensitive services such as conversational voice, and for short intermittent network accesses, as compared to Wireless-LAN network.

Small Cells (such as MICRO, PICO, FEMTO Cells) use the same Radio Access Technology as Macro RAN (UMTS, LTE, CDMA) but have reduced coverage area due to constrained RF power. These may be deployed in the home (such as Home FEMTO), or in dense areas such as airports, stadiums, and shopping malls to increase coverage and capacity in those locations. They share the RF resources with the Macro network of the same Radio Access Technology, and configured by the operator network so as to minimize interference between the small cell network and the overlaid Macro Network. Since they increase the coverage and capacity in a small area, users with low mobility, and higher bandwidth needs are more suitable to migrate to small cells. Additionally, since small cell shares RF resources with similar Macro networks and could increase interference, selectively turning on small cells (or RF Transmitters within small-cell Access Points) only when there is such capacity/coverage need, such as during a game event in a stadium, would significantly improve the network availability and QOE for a number of users in the corresponding Macro Network coverage area.

The present invention uses the network and user KPIs to determine when a capacity/coverage boost is needed, and exports that determination to other network elements in the operator RAN and CN devices, such as SON Server, Small Cell Access Point, WLAN Controller or PCRF. The present invention also identifies which users (IMSIs) would benefit from a small cell network. This identification is based on the user's Mobility Index (which is one of the user KPIs), the user's presence in a densely populated area, such as a stadium, from his mobility pattern and the UE registration within the in-stadium sectors, and the estimated resource needs based on recently used services, and facilitates migrating the user device to Small cell or WLAN network.

According to the prior art, for small cells, when a user device finds the small cell, it attempts to register with it based on signal strength that it received from the small cell. If the user is in the same CSG group (by prior configuration) or the network allows, the user will park with the Microcell, irrespective of load on Microcell, the mobility of the user, or the type of service/app the user device is anticipated to use. In the present invention, the RTND may export the user information (IMSI), his mobility index (SMI), and his service access profile (SAP) that indicates he is considered a heavy video user, or a frequent-access user (i.e. uses application that access network frequently). This information can be used to determine which users are targeted to move to Small Cell. Based on this, the small cell may allow previously unauthorized users to join the small cell. Alternatively, the small cell may disallow previously authorized users if it is determined that these user devices are not appropriate for the small cell.

For exporting information to SON Server or Microcell controller, the RTND may export information such as the number of users in a Macro Network during game event. For example, if the number of users is increasing and crosses 100 users in the last minute, the RTND may determine that additional microcells should be turned on, if available in that location, and the network parameters in that location should be configured to accommodate microcells.

For PCRF and PCEF, the RTND may propagate busy sectors (for top sectors where the SUL score is high), users with high SMI scores, and high SAP score indicating heavy users. Based on this, the external device could initiate actions to migrate new users to alternate networks. It may propagate a list of which users (IMSIs) should be migrated to WIFI to the WLAN controller.

As described earlier, the RAN transit network device may be deployed as an intercepting device, or may transparently monitor logical interfaces between two network devices in one or more Radio Access Networks. Examples of such deployment include IUPS interface in UMTS, S1 interface in LTE, and A10/11 interface in CDMA, and WIFI backhaul networks. The RTND may also be deployed to intercept or monitor multiple logical interfaces in the same Radio Access Technologies in an overlay network consisting of small cell network (for example Micro/Pico cell network in UMTS) overlaid in a Macro network. A RTND processing IUPS, IUCS, and IUH interfaces in a UMTS network is an example of this embodiment.

Identifying an access network appropriate for a user initiating connectivity, or migrating a user from one access network to another, involves the following steps:

(1) Identifying alternative access networks that are available at a location: In one embodiment, the RTND is configured with network overlay information, such as Sectors in the Macro Network with alternative access technologies, such as WIFI access points and their SSIDs, or microcell access points etc. In a second embodiment, the RTND interacts with external devices, such as a WLAN Controller, Microcell Controller, SON Server, the NodeB/eNodeB, an O&M system etc., in the operator network to obtain geographical information of locations with multiple RATs. In a third embodiment, the RTND interfaces with an access point, such as Micro/Pico Cell access point that is co-located in a RAN sector, and receives information on alternative RATs as seen by the Microcell access point. In a fourth embodiment, the RTND is deployed to intercept/monitor multiple access networks, and the RTND learns alternative access networks by correlating a user accessing multiple networks within a short time-window, and by identifying the common subscriber identity or user IP address across these multiple access networks. For example, cellular networks, such as UMTS, LTE, and CDMA, use IMSI to identify a user. When WLAN is deployed by a cellular operator, it may use IMSI based NAI. Thus, in WLAN deployments where IP addresses assigned to users in cellular network are different from IP addresses assigned for the same user in WLAN, the user IP flows in the two networks could not be identified as belonging to the same user. The RTND may identify that two flows belong to the same user based on authentication and DHCP messages (RADIUS etc.) when the RTND is deployed in configurations where it receives WLAN traffic. Alternatively it receives user IMSI to IP association from the WLAN controller, RADIUS server or DHCP Server.

(2) Computing KPIs: The RTND uses various information to find the congestion/utilization state of multiple Radio Access Technologies (such as by using Network KPIs), and aggregate subscriber state (using aggregate subscriber KPIs, such as number of users accessing HD Video, proportion of mobile users, stationary users, types of services active etc.) in that sector. Methods for computing network and user KPIs from the user plane and control plane protocols and the corresponding actions or exporting consolidated information to external devices for control and actions are identified in co-pending U.S. patent application Ser. No. 13/555,787. Network selection methods use some of these KPIs such as:

(a) SUL (Sector Utilization level) which indicates the load on the sector;
(b) STL (Sector Transaction Level) which indicates when control plane load may impact quality of experience of users in that sector;
(c) SMI (Subscriber Mobility Index) that indicates estimated likelihood that a subscriber is mobile, and the frequency of mobility events;
(d) SQI (Subscriber Quality Index) which indicates the bandwidth that a subscriber is getting relative to his demand; and
(e) SAP (Subscriber Application Profile) that indicates the predominant application traffic profile of subscriber, for example, voice, Video, Instant Messaging, background, latency sensitive etc.

(3) Subscriber state (KPI) of the user or users for which network selection or migration is needed in order to estimate the required resources, such as bandwidth from the target network. Per user KPIs, such as SMI, SQI, SAP, and whether he is in a densely used sector, such as in a stadium, define the subscriber state.

(4) Based on all of the above information, the appropriate network for the new user attempting to connect to the network is identified. Also, a set of users that is targeted for migration can be identified, as described in more detail below.

(5) Once the appropriate actions are identified, the RTND may influence the client device or other network elements by propagating information on selected networks, or targeted users. The methods of influencing network selection include modifying ANDSF information exchanges when the RTND is deployed as an ANDSF proxy in the operator network, or exporting the information regarding specific users and the networks that they should migrate to. Influencing the network may also include communicating with a WLAN controller or SON server regarding which users (IMSI's) that should be allowed to connect or not allowed to connect to, thus over-riding any default configurations in the device. Influencing the client device may also include indicating to the device when to turn on or turn off a radio interface, such as WIFI. An example of this usage entails the RTND using the SQI of a user in a RAN sector (that is also connected to a WIFI AP within that sector) to influence a different user in the same sector when his SQI is close to the SQI of the user that successfully connected to WIFI LAN. The present invention may also identify that using the SQI in addition to the sector ID to turn on WIFI decreases the probability that the new user would not be in WIFI coverage area after turning on WIFI, since two identical user devices with the same SQI in RAN Sector are likely in close proximity to each other.

The following shows several examples of use cases using these methods:

RAN Network Selection in Small-Cell and Macrocell Networks (a) A mobile user device (UE) that supports multiple cellular wireless technologies selects the preferred PLMN, and the preferred access network that connects to that preferred network. For example, if the mobile user device finds both LTE and UMTS/HSPA technologies, it may register and connect to LTE network. Within the selected RAT, the user device maintains a set of sectors from which it receives broadcast messages (SIB Broadcasts), and registers with the sector based on received signal strength. In some environments, an overlay network of small-cells may be covering a portion of Macrocell coverage area using the same RAT as macro cell. In this case, if the user device is within the small-cell coverage area, it discovers both microcell and Macro-cell. It may then attempt to register with the small-cell based on CSG List (Closed Subscriber Group) that it maintains. If the small cell network (Microcell, Microcell Network Gateway, HSS, etc.) is configured with the subscriber ID, such as IMSI, it registers the user device with the network and parks on the small-cell. If the registration with the small-cell network does not succeed, it attempts to register with the macrocell. In the prior art methods, the small-cell vs. macro access network selection do not take into consideration other factors, such as small-cell vs. macro network load, user mobile pattern, and access profile, such as heavy network user, frequent network user, or heavy voice user. The present invention identifies network and subscriber KPI in assisting network selection to the appropriate access network within the same RAT. This is accomplished by the RTND receiving subscriber registration attempts with small-cell network (when the RTND is deployed as shown in FIG. 1, monitoring small-cell gateway network device) and influencing the selection by propagating the subscriber-id to the small-network, indicating whether the subscriber should be allowed or not allowed to use the small-cell access point. This mechanism facilitates the network to move users selectively to small-cells based on additional criterion.

(b) When the RTND is deployed to intercept or monitor multiple RATs as in FIGS. 1-4, the RTND receives user registration requests from one of the RATs that the user device attempts to register with. By prior configuration, or importing with other operator network devices, or by learning from control plane and user plane flows from multiple RATs, the RTND determines what other RATs are available in that location. Alternatively, the RTND may receive the access networks seen by a user device, and the signal strengths in those access networks from the Access Point or RAN device. When the RTND is deployed in a plurality of Cellular Radio Access Technologies (for example UMTS, LTE, and CDMA), it influences or triggers inter-RAT relocation based on computed network KPIs, user KPIs and the estimated resources needed for the user device initiating the network selection function. This method is applicable to cellular wireless technologies offered by the same network operator, such as Microcell overlay network or CDMA and LTE by the same network provider.

(c) When RTND is deployed to intercept control plane and user plane protocols as shown in FIG. 1, it may modify or initiate control plane messages to trigger UE parking to alternate RATs, or initiate relocation to an alternate RAT based on the congestion, and type of content being accessed. For example, assume a user selects a HD Video. If the user is currently parked on a 3G cell that has large number of users, and a small cell or LTE/enodeB or WIFI network is known to be available in the same geographical location, the RTND modifies the control plane (CP) messages to trigger inter-RAT relocation and/or assists such relocation by propagating triggers to external CN devices, such as the PCRF.

Access Network Selection Across Dissimilar Access Technologies Such as WLAN, and Cellular Technologies FIG. 10 shows some of the criteria that can be used to determine which network is appropriate for a particular user and when a particular user should be moved.

Figure 8:
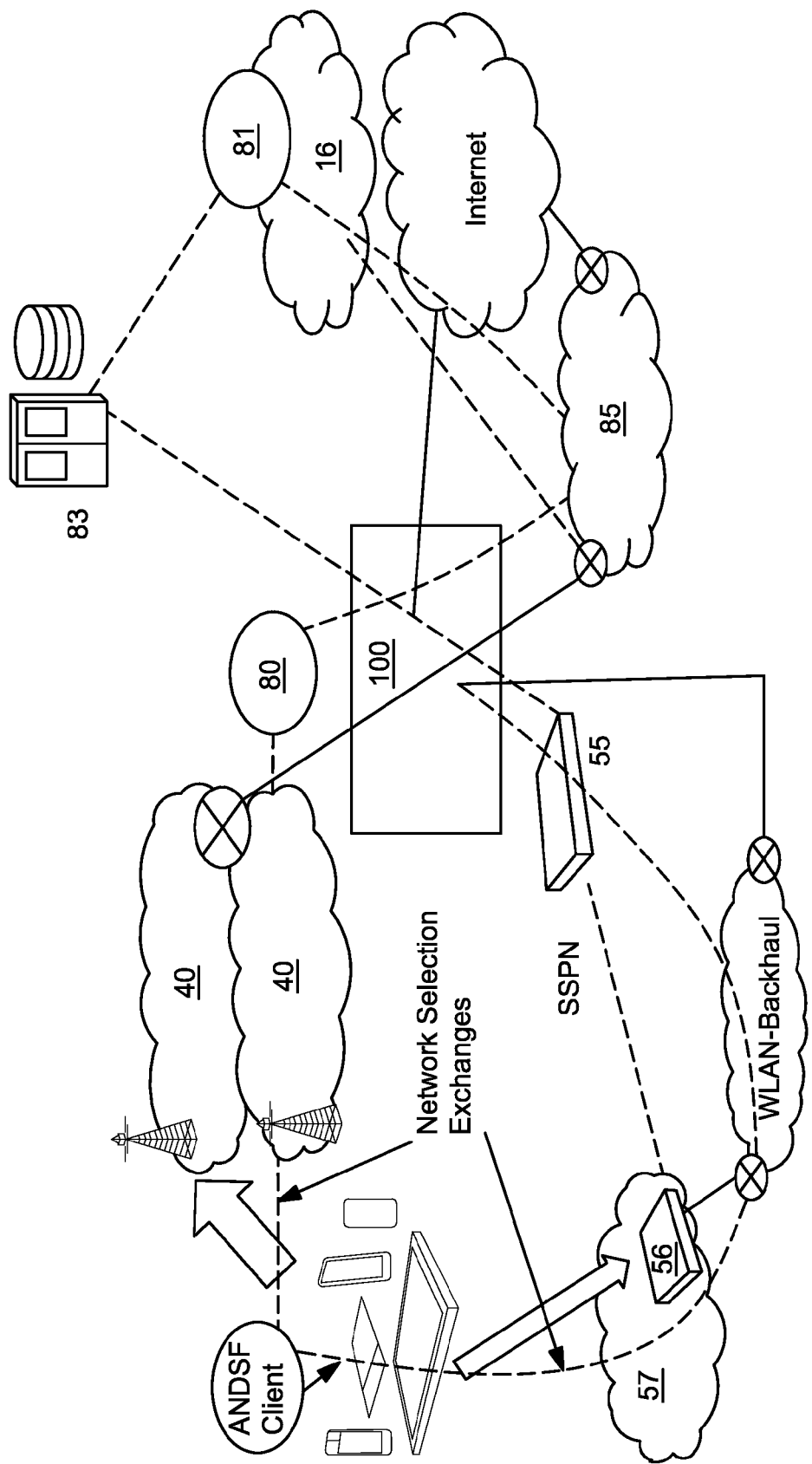
FIG. 8 shows RIND incorporating ANDSF proxy function that uses the network selection methods in accordance with one embodiment. The network selection uses network, user and user application metrics.
Figure 9:
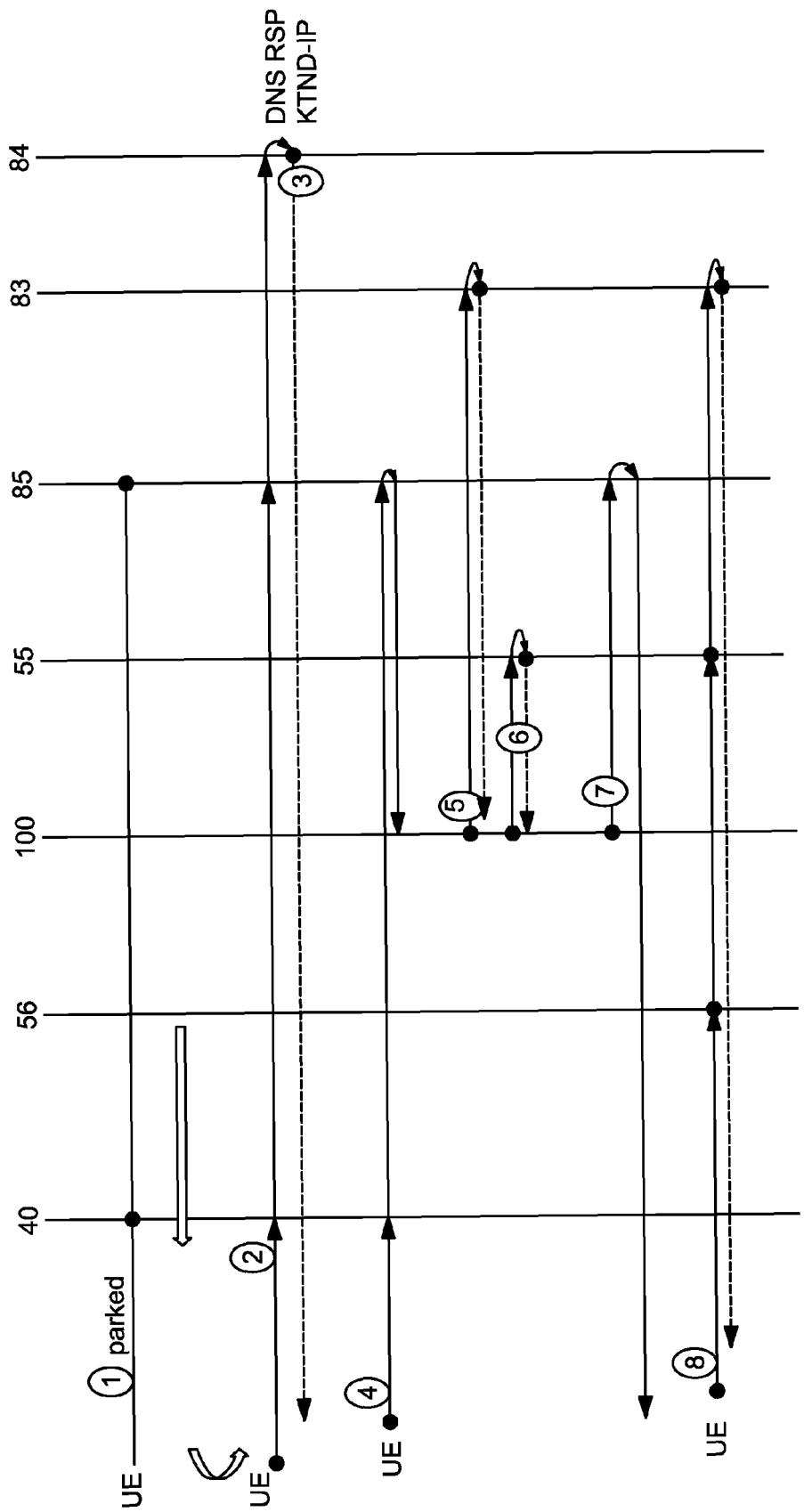
FIG. 9 outlines an example sequence of operations with the RTND performing ANDSF proxy functions in operator network that uses ANDSF features.

(a) 3GPP/LTE standards define Access Network Discovery and Selection Function (ANDSF) in which available access networks in a geographical location are propagated using OMA/DM (Open Mobile Alliance/Device Management) methods to the user device through one or more access networks. A mobile device connects to one of the access networks, and connects to the ANDSF server to discover alternative access networks using OMA/DM defined procedures. The present invention enhances the prior art ANDSF methods by propagating the observed congestion information of one or more RATs, the estimated network usage of the respective RATs based on the current content in use (for example video could last multiple minutes), and history. Alternatively, it may function as an ANDSF proxy by communicating with the ANDSF server and modifying ANDSF responses. An operational sequence of steps how RTND functions as ANDSF proxy by using DNS configuration is shown in FIGS. 8 and 9. FIG. 8 shows the topology of such a system. FIG. 9 shows the sequence of operations which occur where the RTND 100 is operating as an ANDSF proxy 80. First, the UE is parked, having connected to the RAN 40. In step 2, the UE sends a DNS-Query for the ANDSF server 81 to understand whether other networks may be available. In this case, a WIFI network 57 does exist which may be preferable for that UE. In step 3, the DNS server 84 provides a response to the query. This response includes the IP address of the RTND device 100 that serves as the ANDSF proxy 80. The global ANDSF Server IP address may also be in the response. The UE then sends an ANDSF Request to the RTND 100, as shown in step 4. The RTND 100 determines the access plan and pertinent information concerning the WIFI network 57, as shown in steps 5 and 6, respectively. Additionally, the RTND 100 communicates with the policy devices, such as PCRF 16 and authorize the UE on the WIFI network 57. The RTND 100 then generates a ANDSF response to the UE, which indicates that the WIFI network 57 is available to it, in step 7. The UE then attempts to connect to the WIFI access point 56, by authorizing with a policy enforcement device 83, such as a RADIUS server, as shown in FIG. 8.

(b) While incorporating proxy ANDSF server functions as outlined in (a) above, the RTND propagates the alternative access networks available at a certain location based on the congestion/load of the corresponding access network using standards defined push/pull methods. Thus, while the prior art methods define propagating alternative access networks, the present invention makes such information dynamic based on the load and/or content usage on the respective access network. Thus, the RTND may exclude certain networks if it is determined that this network is congested or is becoming congested, or is not suitable for this user. It is important to note that the methods identified in the present invention could be incorporated in a software module and could reside in the RTND, or may reside in other network devices. In network deployments that use ANDSF, the RTND may serve as an ANDSF Proxy. In other configurations, the RTND exports network selection decisions to other network devices to accomplish WIFI offload.

In WIFI overlay deployment with cellular wireless network deployments, such as WIFI hotspots in UMTS, LTE, and CDMA Access networks, as shown in FIG. 5, the RTND may be deployed to intercept or monitor one or more cellular wireless networks but not the WIFI network. Such WIFI hotspots may be managed by a WIFI controller that interacts with plurality of WIFI Access Points. When users register with a Macro-network (UMTS, LTE, CDMA etc.) that has broader coverage area than the WIFI network and start applications that use high bandwidth, such as video, the RTND initiates migration of that specific UE's to the WIFI network by propagating to the WIFI controller congestion information and/or triggers to move specific UEs to the WIFI network. Also, the RTND interfaces with the WIFI controller to exchange WIFI-Hot spot location information, and relocation of UEs to WIFI Access points to present a comprehensive view of multiple access networks at such overlay network locations. This may be achieved as follows. The WLAN controller manages the WIFI-access points, and user's authorization with a WIFI AP is granted by the WLAN Controller. The WLAN Controller will have WIFI AP locations in a specific area geographical coordinates and may have RAN Sector Information. In the prior art, when the user turns on WIFI, his device initiates an authorization request to the WIFI controller which validates the user with the Operator's RADIUS or HSS, and subsequently allows the user. This is irrespective of RAN congestion or user mobility. In one embodiment of the present invention, the RTND exchanges sector information with the WLAN controller, and knows the sectors that have co-located WIFI access points controlled by the WLAN Controller. Since it is monitoring RAN Sectors, the RTND knows which sectors are congested, can identify heavy users consuming significant RAN BW in that sector, and can identify which users are stationary. Based on this, the RTND exports which users (IMSIs) should be allowed to connect to the WLAN. Thus, it allows only those particular users to use WIFI, leaving the remaining users on RAN sectors.

(c) The RTND may receive information on network usage/availability from external network devices such as a WLAN controller or PCRF, modify available access networks/priorities etc., and propagate this information to user devices, RAN devices or other Core Network devices to affect network selection.

(d) The RTND maintains sector information of a specific RAT (for example Sector LAC/SAC in UMTS) and the corresponding geographical co-ordinates either by configuration or receiving such information from an external device. As users establish sessions through the corresponding RAT, and the sector usage reaches configured policy thresholds, the RTND propagates user and sector KPIs to other network devices to initiate network selection (for example to a WIFI controller).

RAN Offload to WIFI and Small Cells in Stadium Deployments During an Event:

One embodiment of how this is accomplished is shown in FIG. 11.

(a) During events in a stadium or another densely populated venue, a large number of users access mobile network for variety of applications, such as voice calls, SMS, uploading pictures, email, Skype etc. Such venues are normally covered by a small number of macro-cells. To increase the coverage area and overcome low coverage spots, operators use distributed antenna systems, where a sector connects to multiple antennas. Additionally, operators deploy additional sectors to increase capacity. However such capacity increases within the same RAT may not be adequate, increase interference, or be too expensive. Thus, several operators deploy overlay small cell and WIFI hot-spots to increase capacity during events. In the prior art, when a device finds a better network (based on priorities configured in the device), it uses that network. Thus, all users close to a hotspot tend to move to that hotspot, thereby causing overload of that hotspot even though capacity is available on cellular RAN. Additionally, users may enter the stadium through marked entrances covered by one or more RAN sectors and WIFI APs. The RTND may be configured with venue sectors, and intercept multiple RATs, identify the user's mobility from entrance sectors to interior sectors and identify them as users in stadium. As the load on a sector increases, the RTND recognizes in-stadium users, their mobility score, bandwidth, frequency of usage (number of times user is accessing the network), and content type (for example video download or image upload), and facilitates moving heavy network users to alternative networks. This is achieved by exporting the user-ids (for example IMSIs) that are best serviced by WIFI to the WLAN controller or ANDSF Server, or by prioritizing WIFI when returning an ANDSF response when deployed as an ANDSF proxy. If the specific deployment has Small-Cell hotspots, the RTND propagates the targeted user IDs to the small-cell controller or SON server that interacts with the Small-Cell-AP.

(b) When the event completes, a large number of users exit stadium via a small number of exits. As users move towards an exit and attempt to use a network (SMS, Skype, voice calls etc.), the number of users in the corresponding sectors/APs increase, and RTND detects mobility pattern. Upon detecting an exit pattern or based on event time configuration, the RTND influences network selection to move users to a cellular RAN. Also, as users exit the stadium, large number of users exit through small number of RAN sectors at the boundary of the venue. The RAN sectors at the boundary of the venue cover users exiting the venue, and other users outside the stadium. While exiting users tend to use network for applications that use small bandwidth or for short time (such as SMS, IM, CS call) etc., from smart phones or feature phones, other users outside the stadium in the same sectors may be using the RAN for longer times, and for higher bandwidth applications. To improve the network access for users exiting the stadium, the RTND may influence moving users outside the venue consuming significant RAN resources by modifying the ANDSF responses, or exporting to other network devices in RAN or CN.

(c) In addition to influencing network selection, when RTND is deployed as an in-line proxy device, as described in U.S. Pat. No. 8,111,630, it is capable of modifying messages, or serving locally cached content to users that migrate to WIFI-LAN, thus offloading RAN users to local WIFI network thereby facilitating serving content local to that venue. Thus in this scenario, RTND performs a network off-load function from RAN to WIFI. While WIFI deployments currently exist that serve local content, WIFI network detection and connection is explicit by the user device in the currently deployed methods. The present invention extends the prior art by using RAN State, User State and user content-profile based network driven selective offload.

Enhancements to WIFI Turn-on Methods in User Devices
(a) As stated earlier, battery drain increases significantly when the WIFI radio is turned on. Therefore, users of smart phones, feature phones etc., tend to keep WIFI turned off. Current WIFI management mobile applications that turn on WIFI selectively, use the history of previous WIFI connectivity in a sector. Thus, if a user successfully connected to a WIFI network in Sector "A" previously, and the user enters the coverage area of the same sector, the mobile application turns on WIFI in the device. However since the RAN Sector coverage area is much larger than WIFI access point coverage area, only users close to the WIFI access point would succeed in connecting to the WLAN. To decrease the probability of turning on the WIFI interface when the user device is not in the coverage area of WIFI access point, in some embodiments, the RTND uses the RAN Signal Quality in the sector as measured in UE, or the RTND influences network selection to determine the priority for WIFI including SQI in addition to the sector ID.

Network Selection During Flash-Mob Scenarios:
(a) Mobile users are best serviced by cellular RAN as mentioned earlier. Operators plan network deployments in locations based on observed and estimated traffic volumes. Also operator's accounting and billing in a cellular network is based on volume usage, which is counted in the mobile core-network. In the many WLAN deployments, the WLAN is managed by a different operator. Even if it is managed by the same cellular operator, it is typically not integrated with the billing system of cellular network. For example WIFI usage, billing and authorization could be based on per units of time (hour, day, month etc.). Thus, even if WLAN is available at a location and the operator has relationship with that WIFI operator, users may not connect to that WLAN. Therefore, when a number of users attempt to use a sector, for example due to stopped traffic at a toll booth or bridge, the user load on the sector increases beyond the capacity of that sector, significantly degrading QOE for a number of users. The RTND, monitoring cellular wireless RAN, detects trending that identifies significant user volume increase (based on per Sector KPIs), users using significant RAN resources and users using RAN for long time periods (for example stationary users in the same sector), and trigger network selection for some users if other RATs are known to be available in the same sector. If other Radio Access Technologies are not available in the same location, it exports control actions to other network elements as identified in U.S. patent application Ser. No. 13/555,787. The present invention extends that earlier patent application by initiating network selection methods to certain users to alternative networks when it detects a sector within a RAT is heavily utilized.

Turning on WIFI Interface in a User Device is Predominantly User Controlled
(a) Even if network defined/operator configured policies evolve, since WIFI consumes significant battery resources, and has different security implications and different charging and billing, it is expected that ultimate control of turning on WIFI interface would continue to be with the user. Access network selection methods driven by operator to overcome RAN congestion by moving users to WIFI would not succeed unless the user enables such operator driven WIFI management. To provide an incentive to users to enable network driven WIFI enablement methods, in some embodiments, monetization triggers, such as coupons, are sent to users when RAN congestion is identified. For example, the RTND identifies network congestion for certain sectors during game events, and also identifies heavy RAN users during that event. The RTND exports "targeted users for network offload" to an operator device such as an ANDSF server or PCRF, which generates incentives to those users via SMS messages, or web-ads. Prior art methods may exist for generating and sending the incentives to users; however initiating such incentives based on congested sectors and identified targeted users for this RAN Offload is one embodiment of the present invention.

Network Selection of Users Travelling by Train
(a) Users commuting by mass transit may use high bandwidth applications such as video, or low bandwidth applications such IM etc. For such mobile users, cellular RAN provides service continuity, as it handles mobility at multiple levels (from sector to sector through soft & softer handovers in HSPA). However supporting services for a mobile user consumes higher RAN resources than for a stationary user, and as the number of users accessing RAN increase, the load in the sectors along the traveling path increases, and the QOE of such commuting users as well as users that are not commuting, but sharing the affected sectors, decreases. To reduce RAN congestion and other monetization reasons operators deploy WLAN access points at transit stations, such as subway stations. When WIFI is enabled in a user device, the user device attempts to connect to a WIFI-AP when the train stops at a station. When user attempts to connect with WIFI, the WIFI-AP propagates authentication messages to WLAN controller or 3GPP Core network etc., and the process may take tens to hundreds of seconds. By the time authentication is completed, the train may have left the station. The situation repeats at the next station. The RTND monitoring multiple RAT technologies, or by communication with WLAN controller, detects the mobility pattern of a number of users (that they registered with sector-A, moved to sector-B, Sector-C etc.), and maintain a list of such users. It exports this information to the WLAN controller or another RAN device, so that the external device could populate the access points with user information and their IP addresses in the transit path so that when the user reaches next station, the mobile device could continue to use the new WIFI access point. Alternatively, if the identity of commuting users is known, the RTND, in coordination with WLAN Controller or ANDSF server, could initiate other users sharing the congested sectors to other RATs during commuting periods, thus reducing contention on RAN sectors.

Other Uses
(a) As subscriber load increases in event venues, RTND may initiate network planning/reconfiguration event to SON server or other O&M devices in the operator network. In one embodiment, CS voice call capacity in a sector is limited. The 3GPP Release 8 specification defines voice over HSPA that increases per sector voice capacity. However, voice over HSPA has the disadvantage that it does not handle user mobility from one sector to an adjacent sector during an active call. Since the RTND computes mobility index for a subscriber (SMI), and identifies which users are inside stadium, it can determine those users who are stationary (and would not be affected by the limitations of HSPA). It can then export a listed set of users targeted for voice over HSPA.

Figure 12A:
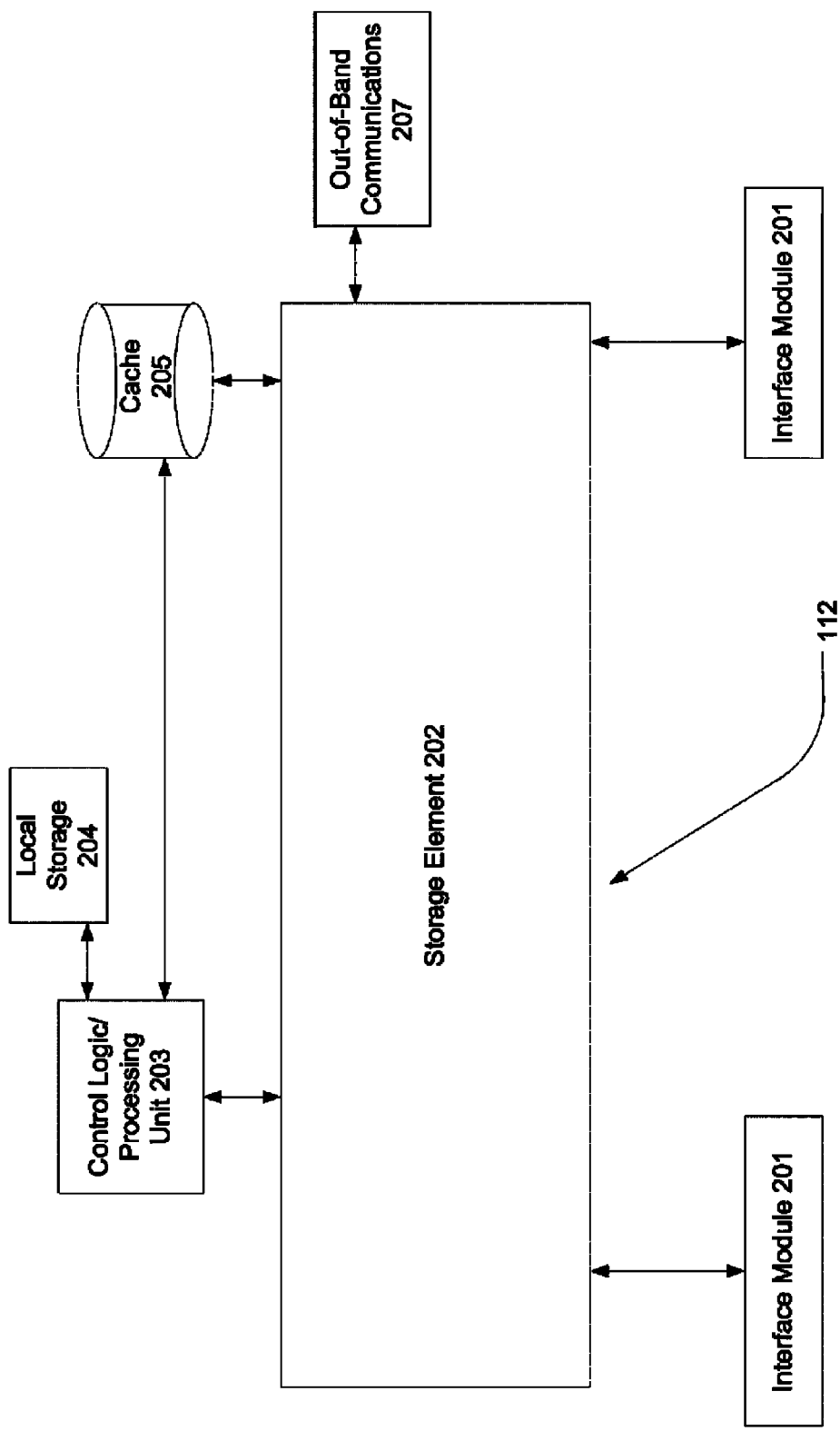
FIGS. 12A-B show representative block diagrams of the RTND according to various embodiments.

FIG. 12A shows a representative block diagram of the RTND according to the embodiment of FIG. 1. In this embodiment, the RTND 112 has two interface modules 201, each of which is adapted to implement the hardware signaling required for the choice interface and the associated software protocol. This interface protocol may be IuB, IuPS or Gn. Each interface module 201 is adapted to receive and transmit on the selected interface. Additionally, received data may be placed into a storage element 202, typically a semiconductor storage element such as a RAM, DRAM or an equivalent technology. The movement of data from the interface module to the memory 202 and vice versa may be accomplished using dedicated hardware, such as a DMA controller. Alternatively, a dedicated data movement processor may be used to handle the actual movement of data through the RTND 112. Once stored within the RTND 112, the information is processed in accordance with the RAN specifications. This may be done using dedicated control logic or a processing unit 203. The control logic/processing unit 203 may have its own local storage element 204, which contains local status and instructions to execute. This storage element may be RAM or DRAM. In addition, at least a portion of this storage element 204 may be non-volatile, such as ROM, FLASH ROM, hard disk, Solid State Disk, or the like. Using known specifications and protocols, the control logic/processing unit 203 parses the received information to understand the packet at each protocol layer. In some embodiments, a large storage element 205, may be included, which is adapted to hold cached information. In some embodiments, this cache storage may be semiconductor memory, such as RAM or DRAM. In other embodiments, this cache storage may be a rotating media, such as a disk drive or other large storage device. The control logic/processing unit may be physically implemented in a variety of technologies. For example, it may be a general-purpose processor, executing a set of instructions from an internal or external storage device.

In another embodiment, a dedicated hardware device having embedded instructions or state machines may be used to perform the functions described. Throughout this disclosure, the terms "control logic" and "processing unit" are used interchangeably to designate an entity adapted to perform the set of functions described.

In some embodiments, an out-of-band communications module 207 may be incorporated in the RTND 102. This module 207 may be used to communicate information to other devices in a proprietary manner.

While in some embodiments, the RTND 112 may be inline, as shown in FIG. 1. In this embodiment, information passes from a first interface module 201 to the second interface module 201. FIG. 1 illustrates the RTND intercepting multiple network interfaces in UMTS and LTE networks. When deployed as an inline intercepting device, the RTND has the ability to modify the message contents or serve locally cached content, and therefore can perform actions based on the summarized information. Additionally, it can forward summarized information to other devices.

Figure 12B:
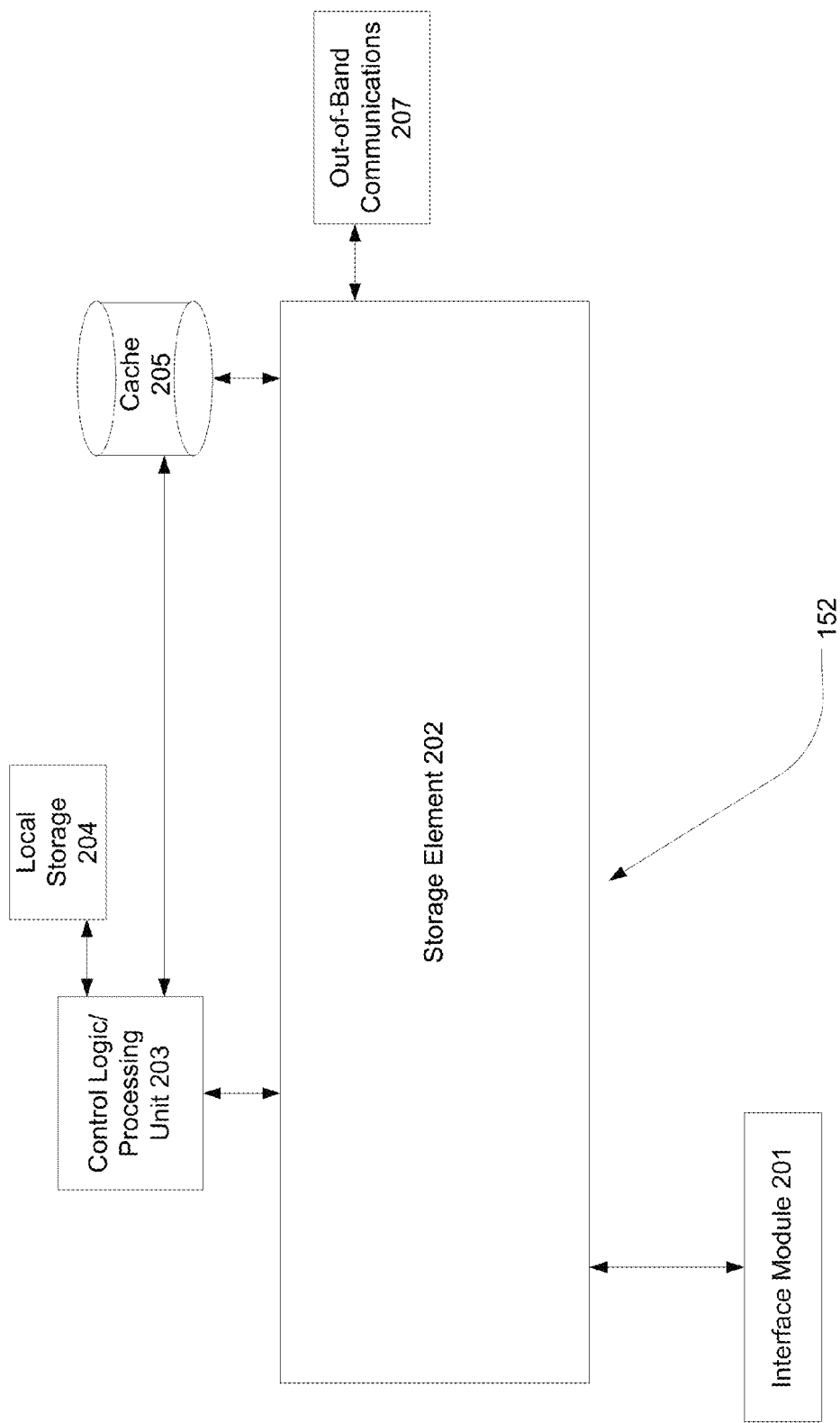

However, in other embodiments, such as is shown in FIG. 2, the RTND operates differently. As shown in FIG. 12B, the RTND 152 may have a single interface module 201, where it "listens" to all communications occurring on the interface between two adjacent devices. In this embodiment, the RTND 152 has the ability to determine state and context of the RAN, however, it is unable to modify the communications between these adjacent devices. The RTND 152 may have an out-of-band communications module 207 to transmit information to other devices. When deployed as a transparent monitoring device, as shown in FIG. 2, using an optical tap interface, the RTND is unable to modify message contents. Therefore, it exports summarized correlated information, thresholds, and suggested actions to external devices. FIG. 2 illustrates that the RTND receives traffic from IUPS, IUCS, IuB interfaces between the NodeB, RNC & SGSN in UMTS network, S1-U, S1-AP, and S11 interfaces between eNodeB, MME, and SGW in LTE Network. FIG. 1 shows the RTND interfacing RAN interfaces of multiple Radio Access Technologies. While the diagram does not show other RATs such as CDMA, the methods and procedure outlined in the current invention are applicable to other RATs as well.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A RAN Transit network device (RIND) for use in a Radio Access Network (RAN), said RAN comprising a plurality of devices, each having one or more interfaces connecting it to an adjacent device, comprising:
   an interface module to receive communications from one or more of said interfaces in said RAN, wherein said communications comprises control plane and user plane information;
   a communications module to export information to one of said plurality of devices;
   a processing unit; and
   a storage element, said storage element comprising instructions adapted to:
      interpret said control plane and user plane information received from said interface module;
      determine one or more network and user performance metrics based on said interpreted control plane and user plane information;
      identify an appropriate network for use by a specific user device based on said determined performance metrics; and
      influence said specific user device to utilize said appropriate network.

2. The RAN Transit network device (RTND) of claim 1, wherein said RTND serves as an ANDSF proxy device and transmits said identified network directly to said user device via said interface module.

3. The RAN Transit network device (RTND) of claim 1, wherein said RAN comprises a WIFI controller, and said RTND transmits said identified network to said WIFI controller via said communications module.

4. The RAN Transit network device (RTND) of claim 1, wherein said RAN comprises a small cell overlay, and said RTND transmits said identified network to a small cell controller via said communications module.

5. The RAN Transit network device (RTND) of claim 1, wherein said RAN comprises an ANDSF server and said RTND transmits said identified network to said ANDSF server via said communications module.

6. The RAN Transit network device (RTND) of claim 1, wherein said RTND dynamically determines said performance metrics and dynamically identifies said appropriate network and influences a specific user to move from a current network to said identified network.

7. The RAN Transit network device (RTND) of claim 1, wherein said performance metric comprises network utilization.

8. The RAN Transit network device (RTND) of claim 1, wherein said performance metric comprises a usage pattern of said specific user.

9. The RAN Transit network device (RTND) of claim 1, wherein said performance metric comprises a mobility pattern of said specific user.

10. The RAN Transit network device (RTND) of claim 3, wherein a user is notified to enable a WIFI radio on said user device.

11. A Radio Access Network, comprising:
a plurality of devices, each having one or more interfaces connecting it to an adjacent device; and
a RAN transmit network device (RTND), comprising:
an interface module to receive communications from one or more of said interfaces, wherein said communications comprises control plane and user plane information;
a communications module to export information to one of said plurality of devices;
a processing unit; and
a storage element, said storage element comprising instructions adapted to:
interpret said control plane and user plane information received from said interface module;
determine one or more network and user performance metrics based on said interpreted control plane and user plane information;
identify an appropriate network for use by a specific user device based on said determined performance metrics; and
influence said specific user device to utilize said appropriate network.

12. The RAN of claim 11, wherein said RTND transmits said identified network to one of said devices via said communications module.

13. The RAN of claim 12, wherein an ability of said user device to use said one of said devices is changed, based on said transmission from said RTND.

14. The RAN of claim 13, wherein said one of said devices is selected from the group consisting of a WIFI controller, a small cell controller, an ANDSF server and a SON server.

15. A Radio Access Network, comprising:
a plurality of devices, each having one or more interfaces connecting it to an adjacent device;
a currently disabled access device, in communication with a controller, said disabled access device capable of communicating with a user device; and
a RAN transmit network device (RTND), comprising:
an interface module to receive communications from one or more of said interfaces, wherein said communications comprises control plane and user plane information;
a communications module to export information to one of said plurality of devices;
a processing unit; and
a storage element, said storage element comprising instructions adapted to:
interpret said control plane and user plane information received from said interface module;
determine one or more network and user performance metrics based on said interpreted control plane and user plane information;
identify that said currently disabled access device should be enabled; and
influence said currently disabled access device to be enabled.

16. The RAN of claim 15, wherein said currently disabled access device is selected from the group consisting of a small cell access point and a WIFI access point.

17. The RAN of claim 16, wherein said RIND communicates with said controller, and said controller enables said disabled access device.

* * * * *